United States Patent [19]
Fountain

[11] 3,819,494
[45] June 25, 1974

[54] METHOD OF REMOVING BRAZE

[75] Inventor: Laurence R. Fountain, West Springfield, Mass.

[73] Assignee: Fountain Plating Company, Inc., West Springfield, Mass.

[22] Filed: Mar. 29, 1973

[21] Appl. No.: 346,181

[52] U.S. Cl. .................................. 204/146, 75/105
[51] Int. Cl. ........................... B01k 1/00, B01k 3/00
[58] Field of Search ...................... 204/146; 75/105

[56] References Cited
UNITED STATES PATENTS

| | | | |
|---|---|---|---|
| 2,735,810 | 2/1956 | Gagliano | 204/146 |
| 2,937,940 | 5/1960 | Weisberg et al. | 204/146 |
| 3,617,456 | 11/1971 | Dillenberg | 204/146 |
| 3,663,388 | 5/1972 | Hedman, Jr. | 204/146 |

Primary Examiner—T. M. Tufariello
Attorney, Agent, or Firm—Chapin, Neal and Dempsey

[57] ABSTRACT

A method of removing a gold alloy braze having palladium or niobium in combination therewith, wherein the braze is first treated with an aqueous solution of an alkali cyanide and a nitro-substituted aromatic compound, then treated with an acid stripping solution and finally treated with an aqueous solution of an alkali cyanide and a chelating agent in the presence of an electric current.

5 Claims, No Drawings

METHOD OF REMOVING BRAZE

BACKGROUND

The present invention relates to a process for the removal of brazing alloys from base metals. In particular, it relates to the removal of brazing alloys containing one or more of the metals gold, silver, nickel, copper or zinc, in combination with palladium and/or niobium from ferritic base metals such as Type 400 stainless steel.

Heretofore, many processes have been devised to remove or strip various coatings from base metals for a number of reasons, e.g., poorly done coatings, incomplete or damaged electroplates and/or removal for replacement purposes. While many methods were able to remove standard electroplating alloys from their base metals, i.e., the removal of alloys consisting of metals such as gold, nickel, silver, and the like, hereinafter called gold brazing alloys, none of the said prior methods were commercially successful where such alloys contained the more exotic metals such as palladium and/or niobium and the like in combination with the basic alloy. This is especially true where such alloys are brazed onto a base metal which is a ferritic-type stainless steel.

It is an object of the present invention to provide a method of removing a gold brazing alloy containing palladium or niobium from a ferritic-type stainless steel base.

It is a further object of this invention to provide a fast and inexpensive method of removing a gold brazing alloy containing palladium or niobium from ferritic-type stainless steels.

The above and other objects and advantages of the present invention will become clear in view of the following specification.

As was pointed out above, prior methods for the removal of plain gold-nickel alloys have been employed with success. However, such methods break down when the standard gold brazing alloy is compounded with exotic metals such as palladium and niobium. In the present inventive method, the basic techniques are employed for the removal of gold or nickel, however, additional techniques are employed to remove the exotic component of the braze. While it is not known why prior methods do not work when one of the exotic metals is present, it is postulated that chemical interaction between the treating compounds and the exotic metal present and/or the base metal form barrier layers which must be removed before the basic stripping process can proceed.

With the above in mind, a method has been found whereby a gold-nickel-palladium brazing alloy can be successfully removed from a ferritic-type stainless steel with a minimum of time and effort. The method basically involves the following steps:

1. Cleaning the base metal and braze of foreign material such as dirt and grease and the like.
2. Treating the braze with an aqueous solution containing a water-soluble alkali cyanide and a nitro-substituted aromatic compound.
3. Rinsing the treated braze with water.
4. Treating the braze with an acid solution.
5. Rinsing the braze again; and
6. Electrochemically descaling the braze in an aqueous solution containing a water-soluble alkali cyanide and a chelating agent.

The above steps are repeated (except for Step 1 which is a preliminary cleaning step) if the braze is not totally removed.

In further explanation of the process the steps thereof are explained below:

Step No. 1 — Cleaning

This step of the process involves the cleaning of the surface of the metal braze that is to be stripped as well as the base metal adjacent to it. It involves the removal of organic dirt and the like by the use of alkali cleaners and the removal of passive films, if any are present, by the action of various acids.

Step No. 2 — Initial strip

Here we are concerned with the removal of the primary metals of the braze, i.e., gold, nickel, silver, etc., by dissolving the same in an aqueous solution of a water-soluble alkali cyanide and a nitro-substituted aromatic compound. As disclosed in U.S. Pat. No. 2,649,361 typical alkali cyanides include the ammonium cyanides, and those alkali metals and alkaline earth cyanides which are ionizable in water to give cyanide ions and are soluble in water.

The nitro-substituted aromatic compounds referred to are typically nitrobenzoic acid and derivatives thereof such as sodium m-nitrobenzoate, nitroaniline, nitrophenol, etc.

Step No. 3 — Rinse

The rinse in this case is a water rinse and is used to remove the initial strip solution from the part being stripped.

Step No. 4 — Acid strip

An acid strip is used at this point in order to remove a barrier layer that is set-up by the initial strip solution. In general, the acid strip is 50 percent nitric acid solution having a minor amount of hydrochloric acid added thereto.

Step No. 5 — Rinse

As in Step No. 3 a water rinse is employed. In this case, however, the rinse is used to remove any trace of the acid used in Step No. 4.

Step No. 6 — Final strip

A final strip is employed via means of electrochemical descaling. In this strip an aqueous solution of a water-soluble alkali cyanide such as that used in Step No. 2, and a chelating agent such as ethylene diamine tetraacetic acid, is used to remove a second barrier layer formed on the braze by the action of the preceding steps. This strip is accomplished with the aid of a reversing DC current in the strip bath maintained at 4–6 volts and 50 amps.

With regard to the above process, it will be noted that a first and a second barrier layer are involved in connection with Steps No. 4 and No. 6 respectively. While the exact composition of the two barrier layers and the reasons why they are formed are not known, it is speculated that the presence of the metals palladium and/or niobium are precursors of the barrier layers. For example, it is postulated that the palladium and/or niobium somehow act as a catalyst which causes migration of ferritic matter from the base metal into the braze and vice versa. If such is the case, it is quite probable that the strip solution used in Step No. 2, reacts with the migrated ferritic material in the braze and within the grain boundary of the base metal to form barrier layers. On the other hand, it is also possible that the presence of the palladium and/or niobium produces a corresponding oxide which acts as a barrier layer. Whether either or both of these possibilities actually takes place is unknown. However, it is known, that if one is to remove a gold-nickel-palladium or gold-nickel-niobium braze, the initial strip which follows the teachings of U.S. Pat. No. 2,649,361 will not work.

In order to further illustrate the method of the present invention the following example is offered:

EXAMPLE I

A brazing alloy consisting of 85 to 90 percent by weight gold and nickel in an 82/18 proportion and 10 to 15 percent by weight nickel powder containing 2 percent palladium was brazed onto a sample part of Type 400 stainless steel. The removal of this braze was accomplished in the following manner:

The part with the brazing alloy thereon was first cleaned with a perchloroethylene degreaser. At this point the part was transferred to an aqueous bath heated to a temperature of about 150° to 180° F and containing 8 oz/gal of sodium m-nitrobenzoate and 12 oz/gal of sodium cyanide. After 15–20 minutes the braze turned from gold to gray-black.

Following a 30–60 second rinse of the part with water at room temperature, the part was placed in an acid bath containing 50 percent nitric acid and having 3 cc of hydrochloric acid per gallon of nitric acid added thereto. After a residence time in the acid bath of from about 15–60 seconds the braze turned from the gray-black color to a gray-gold color.

Following another water rinse at room temperature the part was placed in an aqueous bath containing 1 lb/gal of sodium cyanide and 2 lbs/gal of ethylene diamine tetraacetic acid (EDTA). With the bath at room temperature a 4–6 volt, 50 amp DC current was passed through the bath for a 5–10 minute period with a periodic reverse, i.e., 10 seconds direct current, 20 seconds reverse current. It was noted that the braze turned from a gray-gold color to a gold color.

In the above example, as all of the braze was not removed with one treatment of the part, the method was repeated except for the initial cleaning step.

That which is claimed is:

1. A method of removing a gold alloy braze containing palladium or niobium from a stainless steel base, comprising treating said braze with a first aqueous solution of an alkali cyanide and a nitro-substituted aromatic compound, rinsing said first solution from said braze with water, treating said braze with an acid solution, rinsing said acid solution from said braze with water, and treating said braze in a second aqueous solution of an alkali cyanide and a chelating agent in the presence of a DC current.

2. The method of claim 1 wherein said first aqueous solution is maintained at a temperature of from about 150° to 180° F.

3. The method of claim 1 wherein said DC current is maintained at about 4–6 volts and 50 amps.

4. The method of claim 1 wherein said acid solution is at least a 50 percent nitric acid solution, said alkali cyanide is sodium cyanide, said nitro-substituted aromatic compound is sodium m-nitrobenzoate and said chelating agent is ethylene diamine tetraacetic acid.

5. The method of claim 4 wherein said nitric acid solution contains a minor amount of hydrochloric acid.

* * * * *